United States Patent [19]

Jacquelin et al.

[11] Patent Number: 4,786,460
[45] Date of Patent: Nov. 22, 1988

[54] INSTALLATION FOR HANDLING ASSEMBLIES FORMING THE CORE OF A FAST NEUTRON NUCLEAR REACTOR

[75] Inventors: Roland Jacquelin, Manosque; Henri Venobre, Vinon sur Verdon; Dominique Limouzin, Lyons; Eric Martin, Villeurbanne, all of France

[73] Assignees: Commissariat a l'Energie Atomique; Electricite de France, both of Paris, France

[21] Appl. No.: 55,702

[22] Filed: May 29, 1987

[30] Foreign Application Priority Data

May 29, 1986 [FR] France ................. 86 07712

[51] Int. Cl.⁴ .............................................. G21C 19/20
[52] U.S. Cl. ................................................... 376/270
[58] Field of Search ............... 376/264, 270, 206, 203

[56] References Cited

U.S. PATENT DOCUMENTS

| | | | |
|---|---|---|---|
| 3,915,792 | 10/1975 | Aubert | 376/264 |
| 4,202,729 | 5/1980 | Allain et al. | 376/264 |
| 4,364,899 | 12/1982 | Aubert | 376/264 |
| 4,440,718 | 4/1984 | Plagnard | 376/270 |
| 4,443,403 | 4/1984 | Plagnard | 376/270 |

FOREIGN PATENT DOCUMENTS

| | | |
|---|---|---|
| 2188251 | 1/1974 | France . |
| 2267614 | 11/1975 | France . |
| 2005901 | 4/1979 | United Kingdom . |

OTHER PUBLICATIONS

Journal of the British Nuclear Energy Society, vol. 25, No. 2, Apr. 1986, pp. 85–92, London, GB; J. P. Crette et al.: "From Superphenix 1 to Superphenix 2".

Primary Examiner—Charles T. Jordan
Assistant Examiner—Daniel Wasil

[57] ABSTRACT

In an installation for handling assemblies between the main vessel of a fast neutron nuclear reactor and an adjoining vessel, use is made of a transfer hood formed by a thick tube whose inclined axis can be moved alternatively into the prolongation of the axes of two inclined ramps opening into the main vessel and adjoining vessel respectively, by the rotation of a platform of vertical axis bearing the hood and also two flaps which close the ramps when the reactor is operating, so that an assembly-transferring pot can be guided isostatically inside the ramps and the hood, the platform also possibly comprising a spare flap.

Application to all assemblies forming a reactor core, such as fuel assemblies, lateral neutron screening assemblies and absorbing assemblies.

13 Claims, 6 Drawing Sheets

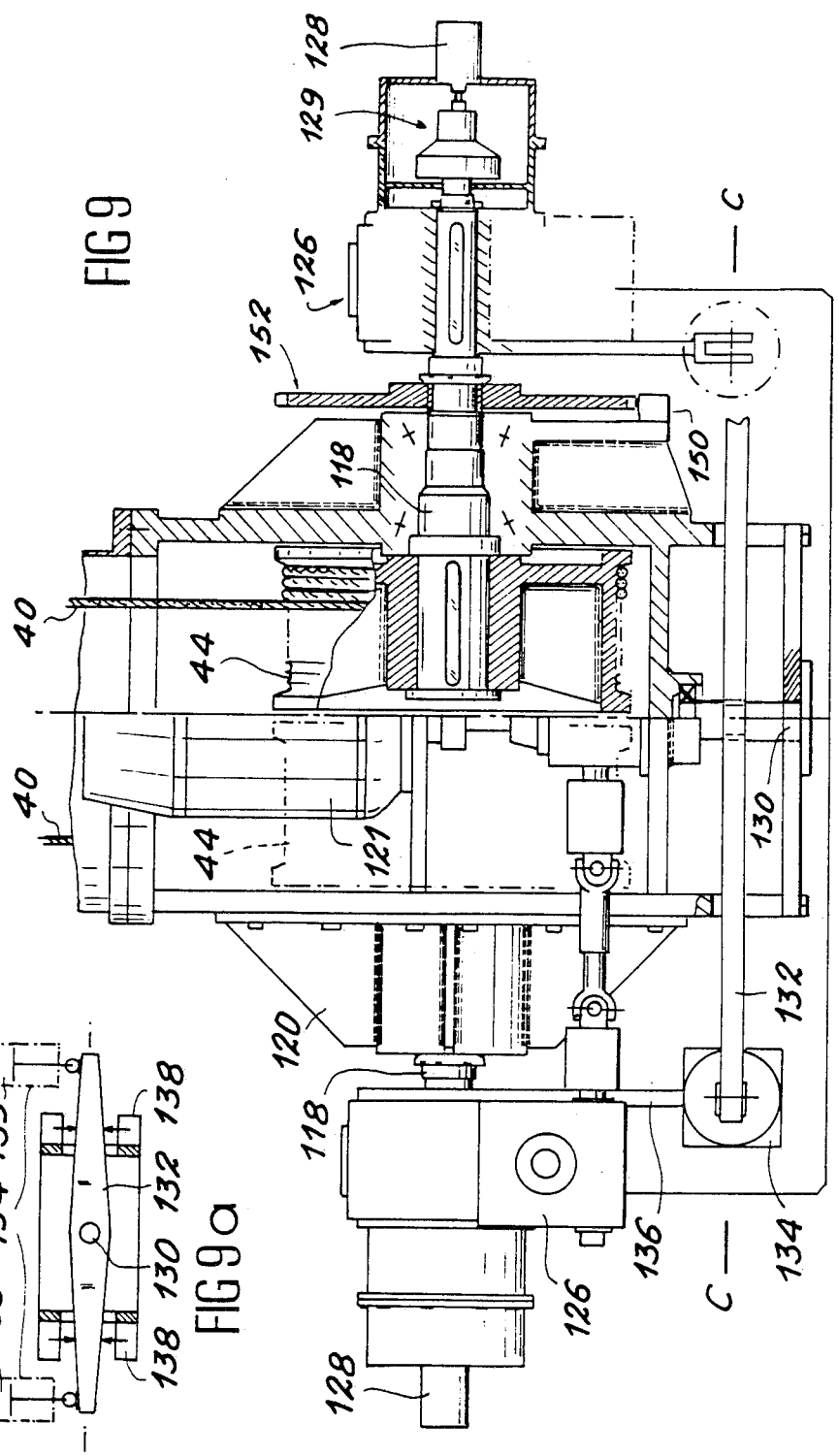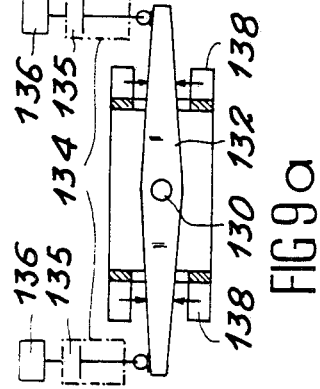

INSTALLATION FOR HANDLING ASSEMBLIES FORMING THE CORE OF A FAST NEUTRON NUCLEAR REACTOR

The invention relates to an installation for handling assemblies forming the core of a fast neutron nuclear reactor between the main reactor vessel in which the core is situated and an adjoining vessel situated alongside the main vessel and possibly used for the intermediate storage of the assemblies.

BACKGROUND OF THE INVENTION

An installation of the kind specified performs the double function of evacuating used assemblies from the main reactor vessel and introducing new assemblies into such vessel.

The assemblies involved in such handling are all the assemblies forming the reactor core, such as the fuel assemblies, the lateral neutron screening assemblies and the absorbing assemblies.

In the French Super Phénix reactor the installation for handling the assemblies comprises a transfer hood disposed above the slab surmounting both the main and adjoining vessels, so as to straddle the adjacent edges thereof. Two inclined ramps extend through the slab so as to produce a communication between the transfer hood and a primary station situated inside the main vessel and a secondary station situated inside the adjoining vessel. The transfer hood and ramps have guide rails along which two pots move each of which transports an assembly. The pots are attached to lifting means comprising chains each entrained by a winch disposed in the upper part of the hood.

The installation for handling the assemblies of the Super Phénix reactor operates symmetrically, one of the pots being employed to evacuate a used assembly, while the other pot is employed to introduce a new assembly into the main reactor vessel. When the two points have been remounted inside the transfer hood, the latter performs a rotation of 180° around its vertical axis, so that each of the pots can descend again via the ramp opposite that via which it was introduced into the hood.

In the Super Phénix reactor assembly handling installation, the transfer hood is generally called the "transfer lock". This name is explained by the fact that slide valves are disposed between the hood and each of the ramps, thus enabling the hood to operate like a lock or sluice during the handling of the assemblies. When the reactor is operating, the slide valves are closed so as to ensure the containment of the reactor vessel.

In practice the sluice-like operation of the transfer hood is not used, since the containment of the interior of the main reactor vessel with respect to the adjoining vessel during the handling of the assemblies is performed by a syphon of liquid metal disposed in the lower part of the ramp descending into the adjoining vessel. The only function of the slide valves, therefore, is to ensure the containment of the main reactor vessel during reactor operation.

The presence of the slide valves between the ramps and the transfer hood means that the pot-guiding rails must be interrupted over a length which is considerable in relation to the diameter of the wheels via which the pots move over the rails.

A first consequence of this break caused by the slide valves is that the pots must be given extra wheels to ensure that they continue to be guided when they pass over the break. In addition to the consequent increase in cost, the extra wheels make the guiding of the pot hyperstatic, so that there is the risk that the pot may be jammed in case of the deformation or angular deviation of the ramps.

Moreover, the breaks introduced by the sidevalves must be crossed at low speed, so that the rate of handling is seriously impeded by the presence of these breaks.

SUMMARY OF THE INVENTION

The invention relates precisely to an installation for handling the assemblies of a fast neutron nuclear reactor which is free from the aforementioned disadvantages and more particularly enables any risk of the pots becoming jammed to be obviated by the use of an isostatic guiding system, while at the same time appreciably enhancing the handling rate, even though the installation is simplified so as to appreciably reduce its cost.

To this end the invention provides an installation for handling the assemblies forming the core of a fast neutron nuclear reactor between a first station situated in a main vessel containing the core and a secondary station situated in an adjoining vessel, such installation comprising at least one pivotable transfer hood, means for pivoting the hood around a vertical axis, two inclined ramps adapted to connect the hood to the primary station and the secondary station respectively, at least one pot for transporting an assembly, means for lifting the pot along guide means inside each of the ramps and the pivotable hood between the primary station and the secondary station, and means for closing the ramps at their top ends when the reactor is operating, wherein the means for closing the ramps comprise two flaps borne by a rotary platform also supporting the transfer hood, such flaps being disposed in locations such that they can be simultaneously placed above the top ends of the ramps via the agency of the means for pivoting the hood when the reactor is operating, the pot cooperating with the guiding means isostatically.

As a result of these features, when the reactor is operating, the top ends of the ramps are closed by flaps, so that containment is maintained. During handling the flaps are retracted into the rotary platform and the hood supported by the platform is successively moved opposite each of the ramps as a result of the platform being rotated. There are therefore practically no breaks between the guide rails formed in the ramps and inside the hood. The extra wheels indispensable in the prior art are therefore eliminated. As a result, the pot is guided along the rails isostatically and there is no risk of jamming, even if there should be a slight angular offsetting between the hood guide rails and the guide rails of a ramp. Moreover, the assembly-transporting pot can be moved at high speed over the majority of its travel. The rate of handling is therefore considerably enhanced, even if the installation comprises only one pot. By way of illustration, the handling installation according to the invention reduces a handling cycle to about 11 mn, in comparison with the figure of about 45 mn for the Super Phénix reactor.

Preferably, to reduce the amount of material and therefore the cost of the installation the transfer hood comprises a thick tube inclined at an angle identical to that of the ramps, so that it can be placed in the prolongation of each of such ramps when the means for pivoting the hood are operated. The thick tube both ensures the hermeticity of the containment and the function of biological screening. Its positioning as close as possible to the radioactive source formed by the transporting pot when it is in the hood enables the volume and therefore the weight of the biological screening to be substantially reduced.

The thick tube forming the biological screening is not heat-insulated internally, so that it forms a heat capacity which also performs thermal regulation, heat transfer taking place by conduction in the thickness of the tube. The thick tube therefore heats the pot when it contains a low-power assembly, while it ensures the cooling of a pot jammed in the hood and giving off a high power. The temperature in the hood can therefore be limited without using active means such as forced ventilation.

To enable a flap to be interchanged quickly if the joints which it supports become worn, the rotary platform can also bear a spare flap disposed beneath a demountable plug extending through the platform, a flap-receiving station formed by a recess formed on a fixed base plate disposed below the platform enabling one of the ramp-closing flaps to be interchanged with the spare flap.

In that case the spare flap and the hood are preferably located in two positions such that the spare flap faces one of the ramps, the hood facing the other ramp.

In a preferred embodiment of the invention a closure member adapted to be attached to an open bottom end of the hood is located in a recess formed in the base plate (the recess preferably corresponding to the flap-gripping station), the hood being demountably mounted on the rotary platform. Due to this feature use can be made of a single hood to handle the fuels on a site comprising several fast neutron reactors. The feature also facilitates hood and pot maintenance operations, which can be carried out in a workshop separated from the actual reactor.

To prevent any differential expansions which may take place in the ramps from causing breaks in the guiding of the pot, preferably the ramps rest on the base plate via swivel links and can expand freely downwards.

In the handling installation of the Super Phenix reactor the means for lifting the pots comprise a single chain for each of the pots. The pots have parachute systems to allow for the risk that a link of the chains may be broken.

In an advantageous feature of the invention, which further simplifies the installation and therefore reduces its cost, the single chain is replaced by two cables simultaneously actuated by a motor assembly and means are provided for detecting any imbalance between the forces exerted via each of the cables. In this way any failure of one of the cables is detected immediately and the reliability of the system is strongly enhanced. The parachute system can therefore be eliminated, with the double advantage of reducing cost and eliminating another possible cause of the pot becoming jammed. The resulting kinematic chain also offers increased safety, since its design enables the load to be moved even after one of the two cables has broken.

BRIEF DESCRIPTION OF THE DRAWINGS

A preferred embodiment of the invention will now be described by way of non-limitative example with reference to the accompanying drawings, wherein:

FIG. 9 is a diagrammatic sectional view partly illustrating the lifting means for moving the pot inside the ramps and the hood by means of two parallel cables, and FIG. 9a is a section taken along the line C—C in FIG. 9.

DETAILED DESCRIPTION OF THE PREFERRED EMBODIMENTS

Figure 1:
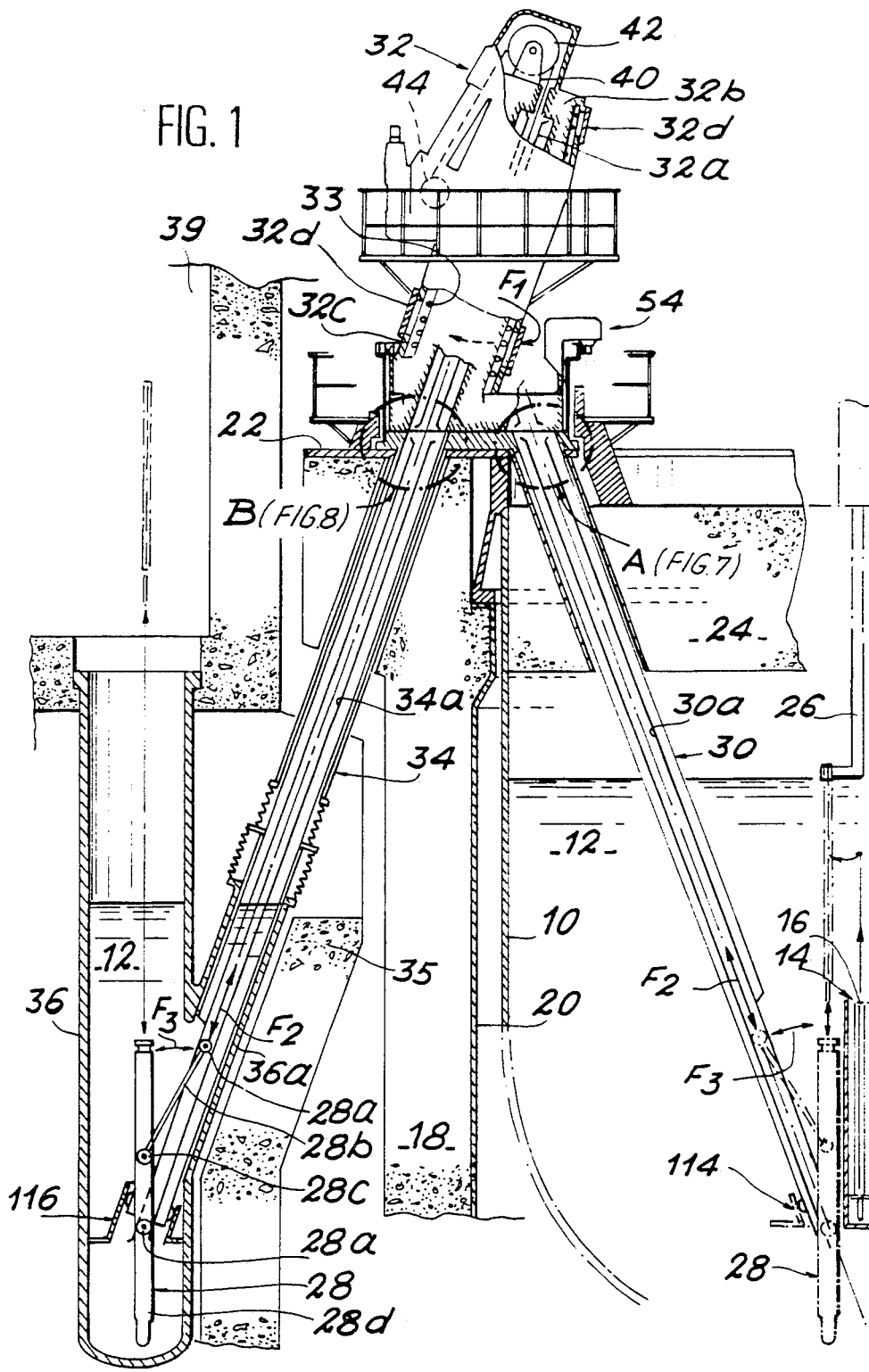
FIG. 1 is a vertically sectioned view showing diagrammatically the assembly of the installation according to the invention.

The right-hand part of FIG. 1 shows a portion of the main vessel 10 of a fast neutron nuclear reactor. In known manner the vessel 10 is filled with sodium 12 and contains the reactor core 14, only a small portion of which is shown in FIG. 1. The core is formed by a large number of fissile, fertile assemblies, one 16 of which is shown.

In reactors of integrated type the main vessel 10 also contains all the components of the primary circuit, more particularly the pumps and heat exchangers. In loop-type reactors at least a proportion of these components is situated outside the vessel 10.

The main reactor vessel 10 is received in a vessel well formed by a concrete structure a portion 18 of which is shown in FIG. 1. A metal skin 20 lining the vessel well 18 forms a safety vessel. The main vessel 10 is suspended by its top end from a horizontal floor 22 covering the peripheral edge of the vessel well.

At its top end the main vesssel 10 is closed by a caisson-type closure slab 24 bearing at its centre, generally via a system of two over-lapping rotary plugs (not shown), an assembly-handling apparatus 16, such as a stirring rod 26.

The rod 26 enables an assembly 16 to be introduced into a handling or transporting pot 28 forming one of the elements of the handling installation according to the invention. To this end the assembly 16 can be taken either from the reactor core 14, or from a storage zone (not shown) provided inside the main reactor vessel 10. Of course, the rod 26 permits the converse handling operation consisting in taking a new assembly from the pot 28 to introduce it into the reactor core 14.

In addition to the pot 28, the handling installation according to the invention comprises a primary ramp 30, a secondary ramp 34 and a transfer hood 32.

The ramps 30 and 34 are inclined in opposite directions by an angle of about 20° to the vertical. More precisely, their axes lie in the same plane, forming an inverted V.

The primary ramp 30 extends through the slab 24 and opens at its bottom end inside the vessel 10 in a zone close to the core 14 and generally called the loading-unloading station of the reactor, referred to hereinafter as the primary station to simplify matters.

The secondary ramp 34 extends through the top end of the vessel well 18 and then the wall 35 of a structure adjacent such well, to enter an adjoining vessel 36 via a tube 36a.

The vessels 10 and 36 are situated at approximately the same level one alongside the other.

As a variant, the wall 35 and the wall of the vessel well 18 might be formed by one single wall.

The diameter of the adjoining vessel 36 differs in dependence on whether the assemblies placed in the vessel have or have not previously been stored inside the reactor vessel itself.

In the embodiment illustrated in FIG. 1, it is supposed that the assemblies have been stored in the primary vessel. The diameter of the vessel 36 is therefore small, since the assemblies can be evacuated directly. To this end a handling system (not shown) can be placed in a cell disposed above the vessel 36.

Like the main reactor vessel 10, the adjoining vessel 36 is filled with liquid sodium 12, as well as the bottom portion of the secondary ramp 34 disposed in the tube 36a. The zone defined by the bottom end of the vessel 36 into which the secondary ramp 34 opens is generally called the secondary loading-unloading station, but to simplify matters will be hereinafter referred to as the secondary zone.

The transfer hood 32 rests on the slab 24 and on the floor 22 and is so mounted as to pivot around a vertical axis (arrow F1) in a manner which will be disclosed in greater detail hereinafter. It should be noted that the axis of rotation of the hood 32 coincides with the axis of symmetry of the ramps 30 and 34.

The hood 32 is mainly formed by a thick cylindrical tube 32b whose geometrical axis is inclined by an angle identical with the angle of inclination of the primary ramp 32 and the secondary ramp 34. By rotating the hood 32 through 180°, therefore, the open bottom end of the hood can be successively moved into the prolongation of the open top end of the primary ramp 30 and into the prolongation of the open bottom end of the secondary ramp 34. The hood 32 is closed at its top end and its internal diameter is approximately the same as that of the ramps 30 and 34.

Due to this configuration the biological screening is situated as close as possible to the assembly during transfer. Although the thickness of the screening is compulsory, in this way its mass and therefore cost are reduced.

The simplicity of shape of the biological screening also enables it to be hermeticized. It therefore ensures the containment of the covering gas above the sodium 12 in the period of handling during the power-generating operation of the reactor.

The thick tube 32b is lined on the outside by a heat insulation 32c allowing an ascending circulation of air or gas by natural convection in an annular space bounded between the heat insulation 32c and the wall of the tube 32b. To this end inlet and outlet windows, whose opening is controlled by closure members 32d, are formed at the bottom and top of the heat insulation 32c respectively. The circulation of air by the natural convection of the air enables the residual power of the fissile assemblies to be evacuated when they are unloaded.

Moreover, the thermal inertia of the thick walls of the tube 32b make a number of hours available to take action in case of an incident.

The hood 32 thus forms a "hot" biological screening ensuring by conduction the thermal regulation of the pot which it contains, without the necessity to use forced ventilation.

To prevent the solidification of the liquid metal contained in the pot during the handling period, a heating system 32 is disposed around the thick tube 32b and in contact therewith.

The handling installation according to the invention comprises a single pot 28 which is moved from the secondary station to the primary station and conversely, passing successively via the secondary ramp 34, the rotary hood 32 and the primary ramp 30 (arrows F2 in FIG. 1). To this end the pot 28 is attached to lifting means which will be disclosed in greater detail hereunder. It will simply be pointed out here that the lifting means comrise two cables 40 whose bottom ends are attached to the pot 28 or, more precisely, to the top end of a rocking rod 28b whose bottom end is articulated at a place 28c to the body 28d of the pot, substantially halfway up such body.

To ensure its guidance when it moves inside the ramps 30 and 34 and the hood 32, the pot has two pairs of wheels 28a guided by rails 30a, 32a and 34a disposed in the ramp 30, the hood 32 and the ramp 34 respectively. One of the pairs of wheels 28a is mounted at the top end of the rockig rod 28b, while the other pair of wheels is mounted on the body 28d, below the articulation 28c.

As shown in FIG. 1, due to the structure of the pot 28 just described and the attachment of the pot to the cables 40 by the top end of the rocking rod 28b, the pot is inclined to follow the rails disposed inside the ramps and the hood and resumes its vertical position when it arrives at the primary or secondary loading-unloading station (arrow F3).

As a result of limiting the number of wheels 28a to two pairs, the pot 28 is guided isostatically inside the ramps and the hood. This eliminates any risk of the pot being blocked during its movement, even if there should be angular offsetting between the hood and one or other of the ramps.

Figure 2:
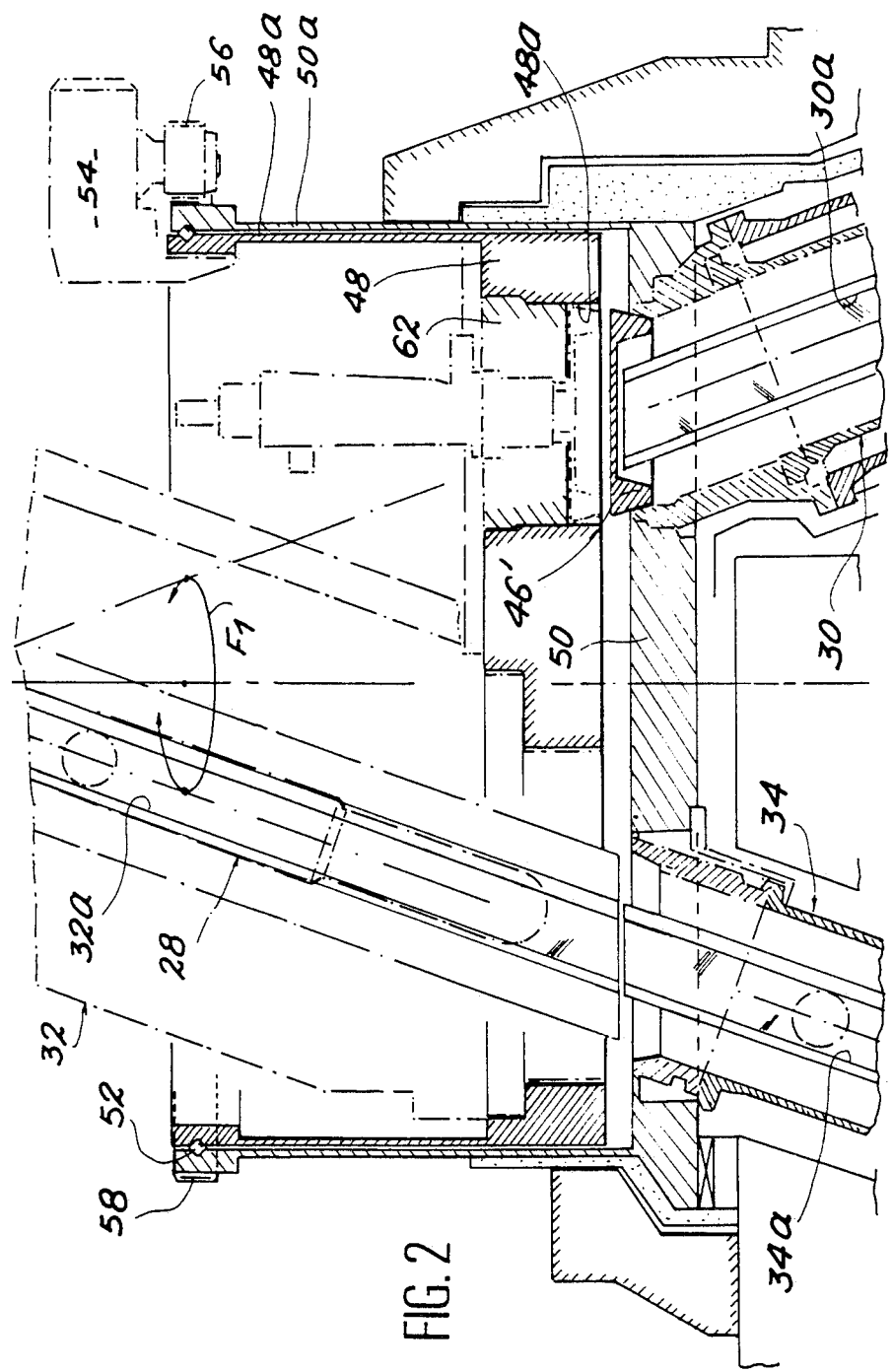
FIG. 2 is a diagrammatic sectional view, comparable to FIG. 1, showing to an enlarged scale the rotary platform supporting the transfer hood and the fixed base plate supports the rotary platform and from which the ramps are suspended.

Referring to FIG. 2, it can be seen that the isostatic nature of the guiding of the pot is made possible by the fact that there is practically no break between the rails 32a of the hood and the rails 30a or 34a of the ramp with which the hood is aligned. There is therefore no longer any need to give the pot extra pairs of guide wheels, as was the case with the handling installation of the Super Phénix reactor.

According to the invention this result is made possible by eliminating the sluice-like operation of the transfer hood during handling. It should be noted that such elimination is perfectly possible, since the sodium 12 contained in the lower portion of the secondary ramp 34 disposed in the tube 36a (FIG. 1) then ensures that the internal atmosphere of the main reactor vessel 10 is contained in relation to the outside.

Thus, according to the invention the open top ends of the primary ramp 30 and the secondary ramp 34 are closed only during the power operation of the reactor. Such closure is performed by means of two flaps 46 (FIG. 3b) mounted on a rotary horizontal platform 48 to which the hood 32 is also attached (preferably demountably). The platform 48 takes the form of a disc whose geometrical axis coincides with the vertical axis of rotation of the platform. The flaps 46 are disposed symmetrically in relation to the vertical axis of rotation of the hood 32 and the platform 48, for example at 90° on either side of the hood.

Each of the flaps 46 is formed by a solid disc of vertical axis bearing at its periphery two toric sealing joints.

Figure 3A:
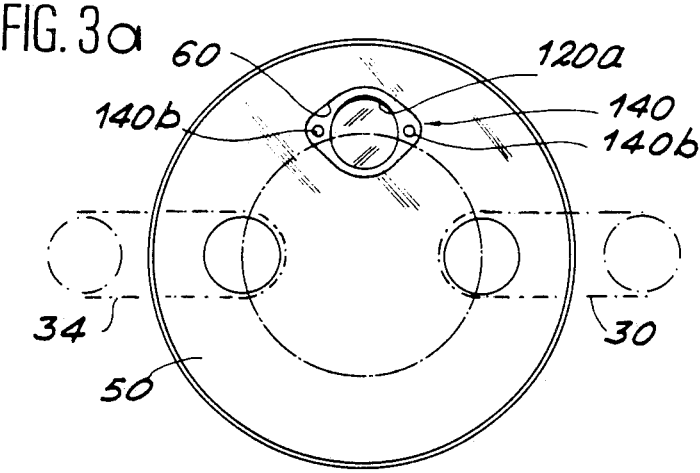
FIGS. 3a and 3b are highly diagrammatic plan views of the relative arrangement of the ramps and the flap-receiving station on the base plate and of the relative arrangements of the hood and flaps on the rotary platform respectively.

The platform 48 is disposed immediately above a fixed base plate 50 which ensures that the platform is supported and rotated. As shown in FIG. 3a, the plate 50 is a horizontal disc-shaped plate which has a diameter slightly larger than that of the platform 48 and whose geometrical axis coincides with the axis of rotation of the platform 48. The top ends of the ramps 30 and 34 open into the plate at diametrically opposite locations.

More precisely, the rails 30a ad 34a of the ramps 30 and 34 project upwards beyond the upper face of the plate 50, the rails 32a of the hood 32 projecting downwards beyond the lower face of the platform 48, so that a very small clearance (a few millimetres) is left between the ends of the rails when the hood is placed above one of the ramps (FIG. 2). A larger space is formed between the plate 50 and the platform 48, so that the latter can rotate when a flap closes one of the ramps.

Thus, at the end of a handling period and before the reactor power rises, the effect of a rotaton of the plate 48 through 90° is to move the diametrically opposite flaps 46 to face the top ends of the ramps 30 and 34.

The control mechanisms of the flaps 46 will be disclosed in greater detail hereinafter with reference to FIG. 5. Here it will merely be stated that during handling, the flaps 46 occupy a raised position in which they are retracted into recesses 48b (FIGS. 2 and 5) formed inside the rotary platform 48, so as not to impede the rotation of the platform. In contrast, when the reactor is operating, the flaps are lowered to hermetically seal the top ends of the ramps. In that position the flaps 46 are completely released from the recesses 48b, so that the platform 48 can similarly be rotated.

Figure 3B:
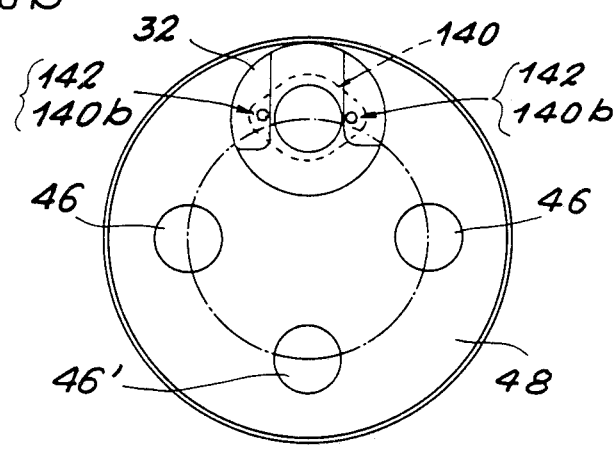

In addition to the two flaps 46 disposed at diametrically opposite locations on the platform 48, the installation according to the invention advantageously comprises another flap 46' forming a spare flap. The third flap 46' is mounted on the platform 48 at a location diametrically opposite that occupied by the hood 32 (FIG. 3b). When the hood 32 is disposed in the prolongation of one or other of the primary 30 and secondary 34 ramps, therefore, the spare flap 46' is situated opposite the top end of the other ramp.

The spare flap 46' is identical with the two other flaps. Similarly, the spare flap control mechanism is identical with the control mechanisms of each of the two other flaps 46.

The presence of the spare flap 46' on the rotary platform 48 has the advantage of enabling either of the two other flaps 46 to be very rapidly interchanged, for example, when the sealing joints of the flaps have become damaged.

Figure 4:
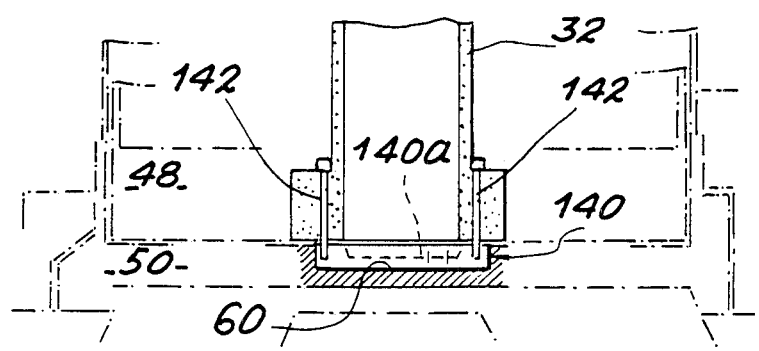
FIG. 4 is a highly diagrammatic view in vertical section which illustrates the positioning of a closure member on the hood before the hood is demounted.

To allow such interchange, the base plate 50 comprises, at a location angularly offset, for example, by 90° in relation to the top ends of the ramps, a recess 60 opening on to the upper face of the plate 50 (FIGS. 3a and 4). The recess 60 forms a withdrawal station for the flaps as a result of which one of the two "active" flaps 46 can be replaced by the spare flap 46'.

The replacement can be performed very simply in the following manner.

In a first stage, with the spare flap 46' and the hood 32 facing the ramps 30 and 34, the operator actuates the control mechanism of the flap 46 to be replaced, which is disposed above the recess 60, to introduce such plate into the recess and disconnect it from its control mechanism. By a rotation of the platform 48 through half a turn, the second flap 46 is in turn moved above the recess 60. The spare flap 46' is then opposite the top end of one of the ramps 30 or 34. The operator lowers such flap inside the base plate 50 and disconnects the flap from its control mechanism, to close the end of the corresponding ramp. By rotating the platform 48 through a quarter of a turn in the opposite direction, the second flap 46 is moved above the other ramp, then introduced into the base plate by the actuation of its control mechanism.

The installation is then in a position to operate, the worn flap 46 having been replaced by the spare flap 46'.

These operations for replacing the flap 46 are so performed that the hood 32 is never opposite a ramp closed by a flap. In this way the cutting of the rails 30a, 32a and 34a is reduced to the minimum compatible with the mechanical constructional tolerances. In practice it is a few millimetres. Moreover, these operations are performed without infringing the hermeticity of the assembly.

Figure 5:
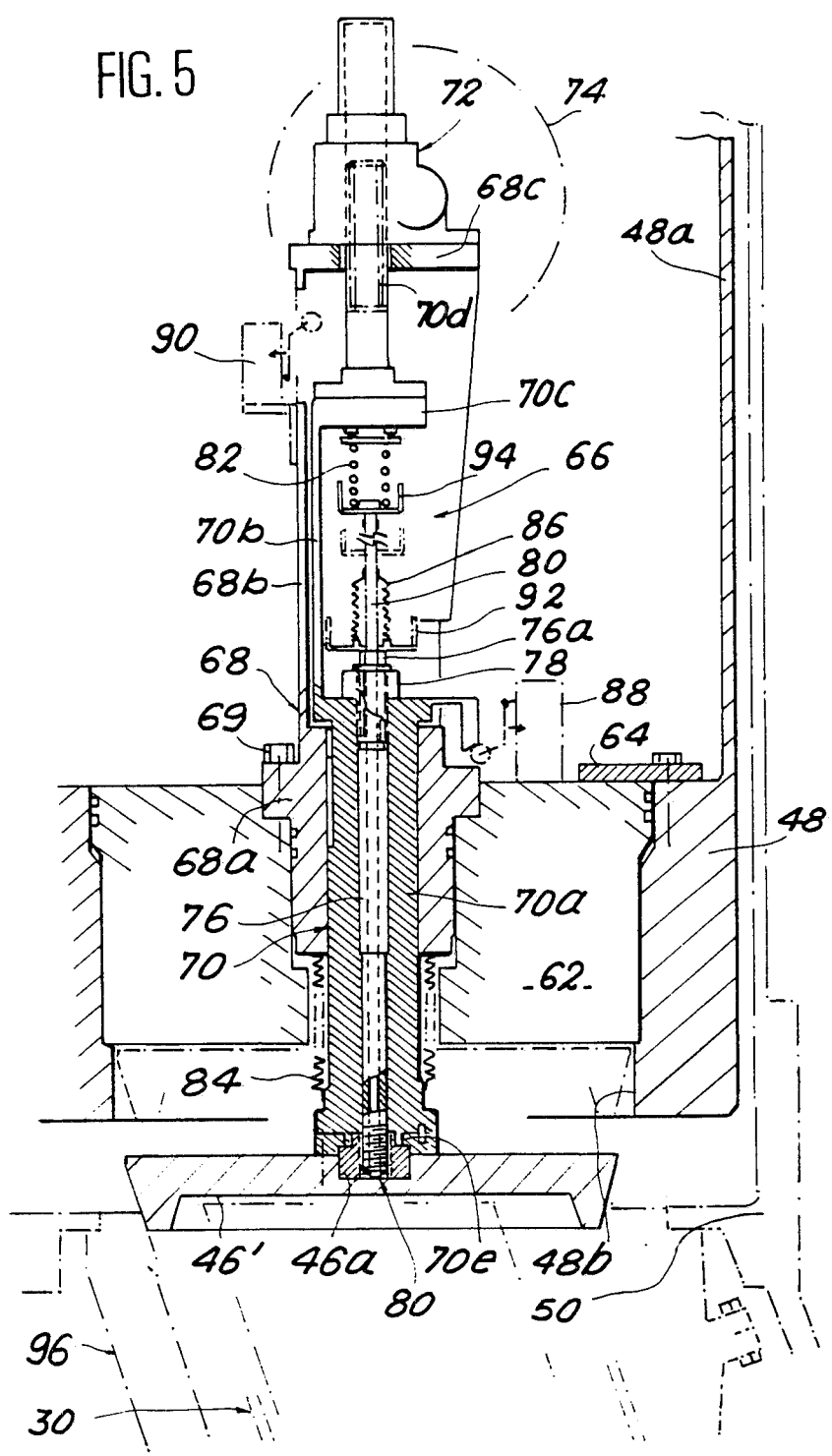
FIG. 5 is a view in diagrammatic longitudinal section showing one of the flaps and its control mechanism to an enlarged scale.

To enable the worn flap 46 to be evacuated and a fresh, spare flap 46' to be introduced in its place, the control mechanism of the spare flap 46' is mounted in the rotary platform 48 via a demountable plug 62, as shown more particulary in FIG. 5.

The plug 62 is mounted and demounted, for example, by unscrewing three shoes 64 screwed on to the top horizontal surface of the rotating platform 48 and bearing against the upper surface of the plug 62. To maintain the containment of the space formed between the rotary platform 48 and the base plate 50, two sealing joints are mounted on the periphery of the plug 62 and an argon-circulating system is provided between the joints. It should be noted that a similar system is used for all the joints ensuring containment.

Referring to FIGS. 3a, 3b and 4, it can be seen that a hood closure member 140 can also be received in the recess 60 formed in the base plate 50. In that case the upper surface of the closure member 140 is formed with a circular recess 140a whose dimensions enable it to receive the spare flap 46' or one of the flaps 46. The closure member 140 also comprises two diametrically opposite lugs which are formed with tapped holes 142b.

When the bottom end of the hood 32 is to be closed, the flaps 46 and 46' are retracted into the rotary platform 48 by actuating the control means associated with them. By rotating the rotary platform 48 the operator moves the bottom end of the hood 32 above the recess 60 receiving the hood closure member 140. Screws 142 permanently received in the wall of the hood 32 are then screwed into the tapped holes 140b. The hood closure member is then attached to the hood 32 to hermetically close its open bottom end. The hood 32 thus closed can then be demounted from the rotary platform to which it is attached, for example, by screws or pins (not shown).

This feature can be used more particularly to take action on the transporting pot 28, which is then moved back into the hood 32. The feature also enables fuel to be handled on a number of reactors situated on the same site, using a single hood 32.

A description will now be given, with reference to FIG. 2, of the means for supporting and rotatably entraining the rotary platform 48 from the base plate 50. These functions are moved upwards, due to coaxial tubes 48a and 50a prolonging the peripheral edges of the platform 48 and the plate 50 respectively upwards, so as to prevent the heat at the level of the plate 50 from breaking down the hermeticity of the rotary joints.

The platform 48 is supported by a rolling bearing 52 with three sets of rollers which is disposed between the top end of the flanges 48a and 50a.

The entrained rotation of the platform 48 is performed by a step-down motor 54 supported by the top end of the tube 48a. The output shaft of the step-down motor 52 bears a pinion 56 meshing with a toothed rim 58 with which the top end of the external surface of the tube 50a is formed.

Preferably the step-down motor 54 provides a fast rotary speed and a slow speed, the latter being used at the end of the movement.

To maintain the containment of the space bounded between the rotary platform 48 and the base plate 50, rotary sealing joints (not shown) are associated with the rolling bearing 52. Moreover, an argon circulation is provided between these joints to enable a leakage of one of them to be detected immediately.

FIG. 5 shows to an enlarged scale the mechanism 66 controlling the movement of the spare flap 46′ between its bottom closure position, shown in solid lines, and its raised retracted position inside a recess 48b formed in the platform 48 below the plug 62 (this position being shown in chain-dot lines). The mechanism also enables the gripping of the flap to be controlled and its presence to be checked.

As already mentioned, the control mechanisms associated with each of the flaps 46 are identical with the control mechanism 66 associated with the spare flat 46a. The following description of the mechanism 66 therefore also applies to the mechanisms used for controlling the two flaps 46, the only difference being that the latter mechanisms are placed directly in the platform, and not in a plug 62.

The control mechanism 66 comprises a supporting member 68 whose lower portion 68a, taking the form of a sheath, is attached hermetically, for example, by screws 69, in a bore extending through the centre of the plug 62. The member 68 is prolonged upwards beyond the flat upper surface of the platform 48, in the form of a vertical portion 68b having a U-shaped horizontal section. At its top end the portion 68b of the member 68 terminates in a horizontal plate 68c.

The member 68 supports a member 70 which can move vertically along the vertical axis shared by the plug 62 and the flap 46′. The lower portion 70a of the member 70 takes the form of a cylindrical sleeve tube slidably received in the lower sheath-shaped portion 68a of the member 68. The member 70 is prolonged above the upper surface of the rotary platform 48 by a vertical portion 70b having a U-shaped section and disposed inside the portion 68b of the member 68. At its top end the portion 70b terminates in a horizontal plate 70c disposed below the plate 68c.

A screwthreaded rod 70d projects vertically upwards along the axis of the plug 62 and the flap 46a, passing freely through the plate 68c. The plate 68c supports an endless screw jack 72 which is actuated manually, for example, by means of a flywheel shown diagrammatically at a place 74 in FIG. 4. By taking action of the jack 72 using the wheel 74, the raising or lowering of the member 70 inside the member 68 can be controlled as required.

The square flap 46′ (or one of the flaps 46) is connected to the bottom end of the member 70 via a hollow vertical rod 76 extending through the lower portion 70a of the member 70. At its bottom end the rod 76 has a screwthreading and projects beyond the bottom end of the portion 70a, so that it can be screwed into a nut 46a borne at the centre of the upper surface of the flap 46.

At its top end projecting above the portion 70a of the member 70, the rod 76 has a hexagonal head 76a enabling the rod of the nut 64a to be tightened or unscrewed using a suitable spanner. The portion of the rod 76 adjacent the head 76a is also screwthreaded to receive a counternut 78 adapted to bear against the upper surface of the portion 70a, to immobilize the rod 76 in the member 70 when the rod is screwed into the nut 46a. In that position a nose 70e in the form of a collar formed at the bottom end of the portion 70a of the member 70 is fitted into the flap 46 around the nut 46a.

The hollow rod 76 has a central bore in which a central rod 80 forming a finger checking for the presence of the flap 46 moves freely. A compression spring 82 interposed between the top end of the finger 80 and the plate 70c of the member 70 always exerts a downward thrust on the finger 80.

Sealing bellows 84 are interposed between the bottom end of the member 68 and the bottom end of the member 70. Similarly, sealing bellows 86 are interposed between the top end of the hollow rod 76 and the top end of the finger 80. Two annular sealing joints are also provided between the portion 68a of the member 68 and the plug 62, an intermediate argon circulation being provided between such joints.

Contactors 88 and 90 are mounted on the plug 62 and the portion 68b of the member 68 respectively to detect the bottom and top positions of the member 70. These two positions of the member 70 correspond to the closure of the corresponding ramp by the flap 46 or the retraction of such flap inside the rotary platform 48 respectively.

In the embodiment shown in FIG. 5, a visual check is made on the gripping of the flap 48 by the hollow rod 76 and the presence of the flap opposite such rod.

For this purpose the top end of the hollow rod 76 is surmounted by a drum 94 bearing a visual reference mark. Similarly, the top end of the rod 80 is surmounted by a drum 94 bearing a visual reference mark. The drums 92 and 94 are disposed inside the portion 70b of the member 70. Corresponding reference marks made on the fixed member 68 enable the gripping of the flap 46 and its presence to be checked.

Thus, when the hollow rod 76 is screwed into the nut 46a, the reference mark formed on the drum 92 is normally opposite a first reference mark on the member 68. When the rod 76 is completely unscrewed from the nut 46a, the reference mark on the drum 92 is opposed a second reference mark on the fixed member. By taking action on the wheel 74, the member 70 is then moved upwards to disengage the nose 70e formed at the bottom end of this member 70 from the flap 46'. When this operation is completed, the reference mark on the drum 92 is opposite a third reference mark formed on the fixed member 68.

In parallel, when the nose 70e of the member 70 is fitted into the flap 46', the reference marker formed on the drum 94 always remains opposite a corresponding reference mark formed on the fixed member 68, since in that case the bottom end of the finger 80 bears against the flap 46.

In contrast, when the rod 76 is unscrewed from the nut 46a and the member 70 moves away from the flap 46', the finger 80 is forced down by the compression spring 82. The reference mark formed on the drum 94 then moves downwards in relation to the corresponding reference marked formed on the fixed member 68. A visual check can therefore be made that the member 70 is properly separated from the flap 46.

Figure 6:
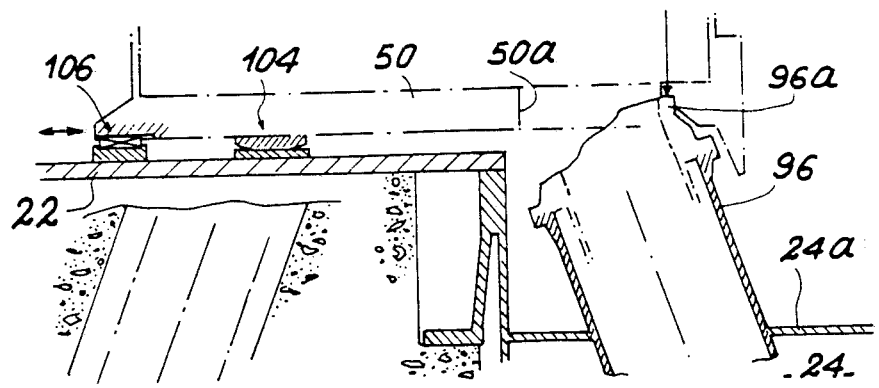
FIG. 6 is a view in diagrammatic vertical section illustrating the supporting of the base plate by the slab surmounting the main reactor vessel and by the vessel well enclosing the vessel.

FIG. 6 shows diagrammatically the principle of the supporting of the base plate 50 by the slab 24 closing the reactor vessel and by the floor 22 disposed on the peripheral wall of the vessel well.

Figure 7:
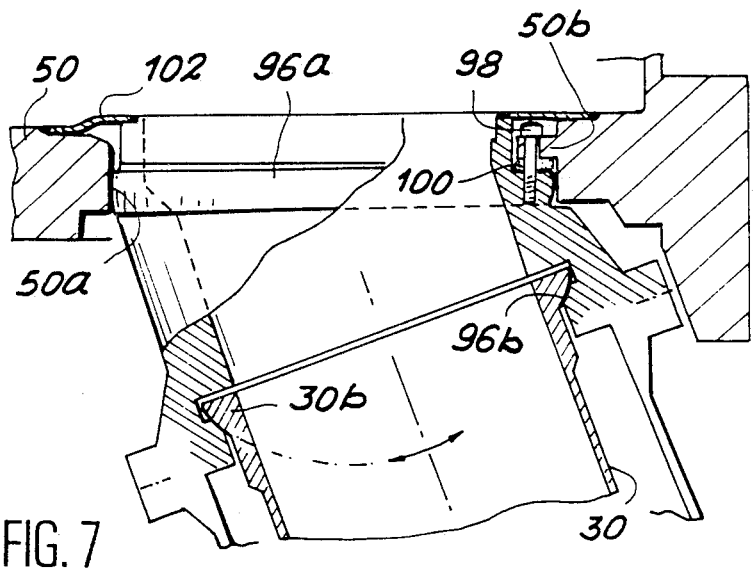
FIG. 7 is a sectional view, to an enlarged scale, of the portion A of FIG. 1, corresponding to the attachment of the top end of the ramp for transporting the assemblies between the main reactor vessel and the transfer hood.

A tube 96 encloses the primary ramp 30 in the portion thereof which extends through the slab 24 and is situated thereabove. The tube 96 is welded to the top flange 24a of the slab 24 and comprises at its top end a spherical bearing area 96a received in a cylindrical passage 50a in the plate 50, as illustrated in FIGS. 6 and 7.

The base plate 50 rests on the top end of the tube 96 via a shoulder 50b disposed in the passage 50a above the cylindrical portion thereof in which the spherical bearing surface 96a is received. So as not to block the swivel link formed by the cooperation between the surface 96a and the bore 50a, the plate 50 is attached to the end of the tube 96 only in that portion of the shoulder 50b which is furthest away from the vertical axis of the base plate 50. Such attachment is obtained by means of pins 98 or the like, a bearing wedge 100 being interposed between the shoulder 50b and the tube 96.

Hermeticity is produced between the base plate 50 and the top end of the tube 96 by a resilient diaphragm 102 (FIG. 7) in the form of washer, whose external and internal peripheries are welded to the upper surface of the plate 50 and the end of the tube 96 respectively.

To prevent any differential expansion between the base plate 50, the upper flange 24a of the slab and the floor 22 from affecting the mechanical behaviour of these members, the swivel link just described, between the tube 96 borne by the slab and the base plate 50, is completed by two shoes 104 disposed at about 120° in relation to such swivel link. The shoes 104 are sliding shoes with which the lower surface of the base plate 50 is formed and which rest on the floor 22.

To prevent the plate 50 from rotating horizontally around the swivel link 96a-50a, a key-type guide system 106 is provided at a location diametrically opposite from the swivel link. The guide system 106 is oriented radially in relation to the vertical axis of the plate 50 and disposed between the lower surface of the plate 50 and the upper surface of the floor 22.

As was already shown, one of the main advantages of the invention is the small clearance between the guide rails 30a and 34a formed inside the ramps and the guide rails 32a formed in the hood 32. To keep such spacing substantially constant at all temperatures, the ramps 30 and 34 are suspended from the base plate 50 in a manner which will now be disclosed in greater detail with reference to FIGS. 7 and 8.

As shown by FIG. 7, the primary ramp 30 is supported by a spherical bearing surface 30b bearing swivelably against a conical bearing 96b formed inside the tube 96 adjacent the base plate 50.

In a comparable manner (FIG. 8), the secondary ramp 34 has adjacent its top end a spherical bearing surface 34b which bears swivelably against a frustoconical bearing surface 108a formed on a member 108 attached to the lower surface of the base plate 50.

Hermeticity between the top end of the ramp 34 and the base plate 50 is provided by a resilient diaphragm 110 in the form of a washer, whose external and internal peripheral edges are welded to the upper surface of the plate 50 and the lower surface of the secondary ramp 34 respectively.

Figure 8:
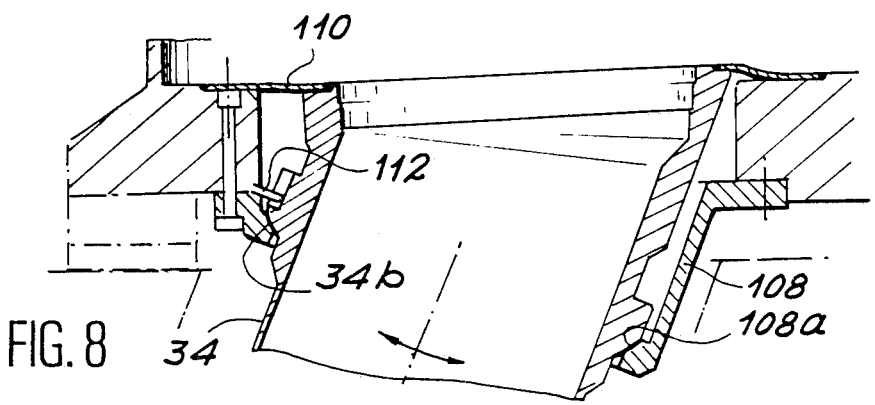
FIG. 8 is a sectional view, to an enlarged scale, of the portion B of FIG. 1 corresponding to the attachment of the top end of the ramp opening into the adjoining vessel.

Of course, means are provided in association with the swivel links just described with reference to FIGS. 7 and 8, to prevent the ramps from rotating in relation to the members supporting the ramps. As shown in FIG. 8 in the case of ramp 34, the means can more particularly be formed by a finger 112 connected in this case to the member 108 and entering a suitably shaped recess in the ramp 34.

To complete the supporting performed by these swivel links without producing mechanical stress in the primary and secondary ramps, their bottom ends are guided by guide members 114 and 116 (FIG. 1) attached to the internal structures of the main vessel 10 and the adjoining vessel 36 respectively.

As already stated, the means for lifting the pot 28 comprise two cables 40. FIG. 1 shows how the cables pass over two return pulleys 42 of common horizontal axis disposed above the hood 32, before being wound on two drums 44 also having a common horizontal axis.

FIGS. 9 and 9a show the motorization system for simultaneously driving the two drums 44 on which the lifting cables 40 are wound (the system is shown in section in the right-hand half of FIG. 9). FIG. 9 clearly shows that the motorization system is symmetrical in relation to the vertical plane containing the axis of the hood 32.

The drums 44 are therefore disposed on either side of such plane of symmetry on two coaxial driving shafts 118 separately supported rotatably by a single casing 120 attached to the outside of the hood 32. The shafts 118 project outside the casing 120, where each of them is rotated by an irreversible step-down motor 126 whose casing is not connected to the casing 120. The input of each of the step-down motors 126 is connected to the output shaft of a single asynchronous motor assembly via an angle gear 122 and two universal joint mechanisms 124.

More precisely, the geometrical axis shared by the motor 122 at its output shaft and at the angle gear 122 lies in the plane of symmetry of the motorization system, the mechanism 124 being oriented normally in a direction perpendicular to such plane and lying on either side thereof.

The motor assembly 121 preferably enables the movement of the pot to be controlled at high and low speed, the latter being used only at the end of movement of the pot, or on its arrival in the hood, or on its arrival at the primary and secondary loading-unloading stations. To this end the assembly 121 in that case has two asynchronous motors with incorporated brakes, whose common output shaft also comprises a torque limiter.

Preferably an optical encoder 128 is disposed at the end of each of the shafts 118, if necessary behind a reducing gear 129, so that the position of the pot in the installation can be detected at any moment.

A bolt 150 is mounted on the casing 120 opposite a toothed rim 152 rotated by one of the shafts 111, to block the drum 44 if action must be taken on the corresponding reducing gear 126. Although this is not shown in FIG. 9, a similar arrangement is provided on the other shaft 118.

The motorization system just described comprises two kinematic chains which are perfectly symmetrical in relation to the vertical plane of symmetry defined hereinbefore. In this system, due to the floatable mounting of the casings 126 of the step-down units and the presence of universal joint mechanisms 124, any imbalance occurring between the torques exerted on each of the shafts 118 results in the pivoting in the opposite direction of the casings of the step-donwn units around such shafts. By detecting such pivoting, it is therefore possible to immediately detect such an imbalance and therefore the start of rupture of one of the cables 40.

To this end the casing 120 also supports the pivot 130 of an imbalance-detecting level or rocker 132. The pivot 130 coincides with the axis of the motor assembly 121 and the lever 132 extends symmetrically on either side of such pivot 130. At each of its ends the lever 132 is attached to the end of a shock-absorber 134 whose axis is oriented in a direction at right angles to both the geometrical axes of the motor 121 and of each of the shafts 128.

Each of the shock-absorbers 134 comprises a weighing cell 135 (FIG. 9a) and is articulated by its opposite end to a lever 136 connected to the casing of each of the step-down units 126 and oriented radially in relation to the corresponding shaft 128.

When the torques exerted on the shafts 128 are equal, the levers 136 are perfectly symmetrical in relation to the plane of symmetry of the system. In contrast, if an imbalance appears between the torques exerted on each of the shafts 128, for example, because of the start of rupture of one of the cables 40, the casings 126 of the step-down units tend to rotate in the opposite direction around the axis shared by the two shafts 128. The relative rotation is transmitted to the lever 130 via the shock-absorbers 134 and is immediately detected by electric contacts 138 (FIG. 9a) mounted on the casing 120 and sensitive to any offsetting of the level 132 in relation to its equilibrium position.

It should be noted that the lever 132 also allows the incorrect winding of one of the cables 40 on to the corresponding drums 44. From this aspect the structure of the drums 44 and the casing 120 is such that the cables can never escape from the drums.

Advantageously sight holes can be provided, more particularly in the casing 120, to enable the condition of the cables 40 to be checked visually. Moreover, the casing 120 (which also contains the return pullies 42) and the hood 32 are heated to about 150° C. to avoid hooping on the drums due to cable.

Preferably the installation is also designed in such a way that the portion of the cables 40 wetted by the sodium 12 is never wound on to the drums 44.

Lastly, a manual control (not shown) enables the movable equipment to be returned to a safe position in all cases.

As a result of all these features of the pot-lifting system, safety is such that the pot parachute of the existing installations is no longer needed. The elimination of the parachute enables another possible cause of the jamming of the pot in the ramps to eliminated. It also results in an appreciable reduction in the cost of the installation.

Finally, the installation according to the invention leads to considerable progress in comparison with existing installations. In the first place, it practically eliminates any risk of the pot getting jammed, and all the difficulties arising therefrom. Secondly, it reduces the mass, space occupied and more particularly the cost of the installation (more particularly the hood) to a very important extent. Lastly, it allows a global doubling of the rate of handling, despite the simplification of the system (one single pot).

Of course, the installation disclosed can be modified in various ways without exceeding the scope of the invention. Thus, merely by way of example, the flaps and the hood can be differently positioned on the rotary platform from the way shown in FIG. 3a. More particularly, if the vertical pivoting axis of the platform is offset in relation to the vertical plane containing the axes of the ramps, the flaps will not be situated at diametrically opposite locations on the platform.

The ramps can also be located in two parallel planes, so as to deal with two pots associated with two hoods identical with the hood 32 described, but offset on the platform 48 in relation to the vertical pivoting axis of the platform. This arrangement enables the handling rate to be substantially improved.

What is claimed is:

1. An installation for handling assemblies forming a core of a fast neutron nuclear reactor, between a primary station situated in a main vessel containing the core and a secondary station situated in an adjoining vessel, said installation comprising: at least one pivotable transfer hood, means for pivoting the hood around a vertical axis, two inclined ramps for connecting the hood to the primary station and the secondary station respectively, at least one pot for transporting an assembly, means for lifting said at least one pot along guiding means inside each of the ramps and the pivotable hood between the primary station and the secondary station, and means for closing the ramps at their top ends when the reactor is operating, comprising two flaps, the hood being attached to a rotary horizontal platform such that the hood and platform rotate as a unit around said vertical axis, said flaps being mounted on the platform in locations such that the flaps can be simultaneously placed above the top ends of the ramps by said means for pivoting the hood when the reactor is operating, said at least one pot comprising two pairs of wheels cooperating with the guiding means.

2. An installation according to claim 1, wherein the transfer hood comprises a thick tube inclined at an angle identical to that of the ramps, so that it can be placed in an extension of each of said ramps when the means for pivoting the hood are operated.

3. An installation according to claim 2, wherein the thick tube is lined externally with a heat insulation cooperating with the tube to bound an annular space for the circulation of a cooling fluid, openings bounded by windows formed at a top and bottom of the heat insulation being controlled by closure members.

4. An installation according to claim 3, wherein heating means are disposed around the thick tube in contact therewith.

5. An installation according to claim 1, wherein the rotary platform also bears a spare flap disposed beneath a demountable plug extending through the platform, a flap-receiving station formed by a recess formed on a fixed base plate disposed below the platform, thereby enabling one of the two flaps to be interchanged with the spare flap.

6. An installation according to claim 5, wherein the spare flap and the hood are disposed in two locations such that they can be placed simultaneously above the top ends of the ramps by the means for pivoting the hood when the reactor is shut down.

7. An installation according to claim 5, wherein a closure member adapted to be attached to an open bottom end of the hood is located in a recess formed in the base plate, the hood being demountably mounted on the rotary platform.

8. An installation according to claim 7, wherein the closure member is located in the recess in the flap-receiving station.

9. An installation according to claim 5, wherein the ramps rest on the base plate via swivel links and can expand freely downwards.

10. An installation according to claim 5, wherein the base plate rests via a swivel joint on a tube connected to a slab closing the main vessel, the tube enclosing the ramp connected to the primary station and the base plate moreover resting via sliding supports on a floor into which the ramp connected to the secondary station opens.

11. An installation according to claim 1, wherein the means for lifting the at least one pot comprise two cables wound at one end on two drums simultaneously actuated by a common motor assembly, the opposite end being attached to the at least one pot, means being provided, to detect any imbalance between the forces exerted on each of the cables.

12. An installation according to claim 1, wherein the guiding means inside each of the ramps and the pivotable hood are rails, the ends of the rails of the hood and of the rails of the ramps being separated by a limited clearance when such rails are aligned.

13. An installation according to claim 1, wherein each of the flaps is mounted on the rotary platform via a control mechanism enabling the flap to be moved between a top position in which the flap is retracted into a recess in the rotary platform and a bottom position in which the flap closes the end of one of the ramps, the control mechanism also comprising means for gripping the flap.

* * * * *